United States Patent [19]

Zardi et al.

[11] Patent Number: 5,779,988
[45] Date of Patent: Jul. 14, 1998

[54] HETEROGENEOUS SYNTHESIS METHOD AND APPARATUS INCLUDING WALL TEMPERATURE PROTECTION

[75] Inventors: Umberto Zardi, Via Lucino 57, CH-6932 Breganzona, Switzerland; Giorgio Pagani, Milan, Italy

[73] Assignees: Ammonia Casale, S.A.; Umberto Zardi, both of Switzerland

[21] Appl. No.: 432,466

[22] Filed: Feb. 28, 1995

Related U.S. Application Data

[63] Continuation-in-part of Ser. No. 16,747, Feb. 11, 1993, abandoned.

[30] Foreign Application Priority Data

Feb. 12, 1992 [CH] Switzerland ............... 00409/92

[51] Int. Cl.$^6$ ............................................. C01C 1/00
[52] U.S. Cl. ................... 422/148; 422/202; 422/203; 422/204
[58] Field of Search ................... 422/148, 202, 422/203, 204

[56] References Cited

U.S. PATENT DOCUMENTS

| | | | |
|---|---|---|---|
| 4,746,329 | 5/1988 | Christner et al. | 422/203 |
| 4,935,037 | 6/1990 | Koyama et al. | 422/204 |
| 4,935,210 | 6/1990 | Zardi et al. | 422/148 |
| 5,219,535 | 6/1993 | Giacobbe et al. | 422/204 |

*Primary Examiner*—Timothy McMahon
*Attorney, Agent, or Firm*—Ostrolenk, Faber, Gerb & Soffen, LLP

[57] ABSTRACT

Method for the protection of the internal walls of the shell of Braun type converters, transformed into axial-radial reactors with insertion of a cartridge and a cylindrical perforated wall, characterized by the fact that cooling gas is circulated (FLU) at temperatures between 250° and 300° C. in the airspace (I) between cartridge (C) and (P).

13 Claims, 3 Drawing Sheets

5,779,988

HETEROGENEOUS SYNTHESIS METHOD AND APPARATUS INCLUDING WALL TEMPERATURE PROTECTION

This application is a continuation-in-part of application Ser. No. 08/016,747 filed Feb. 11, 1993, now abandoned the specification of which is hereby incorporated by reference.

BACKGROUND OF THE INVENTION

This invention relates to a method for modernizing converters for heterogeneous synthesis at high temperatures and pressures, in particular for the production of ammonia, the converters having at least one external pressure vessel having an upper major zone which is substantially cylindrical and a lower minor zone which is substantially reversed. An internal cartridge is open at the top, and creates a gas passage between the external side and internal side of the shell. The cartridge is filled with catalyst through which the synthesis gas axially passes from top to bottom. Inlets are provided for fresh synthesis gases and for cooling gases, and an outlet is provided for reacted gases.

In particular the invention relates to a method of the kind which modifies, with an "in-situ" operation, for instance, converters of the preceding type, known as Braun reactors, and protects the shell walls from high temperatures.

These converters for the conversion of nitrogen and hydrogen to ammonia in the presence of catalyst, function under very severe operating conditions, the shell walls and the feed openings being subjected to temperatures in the range of 400° C.

The construction materials of the reactor must be highly resistant to thermal stresses and are thus, for example, made of steel 2,25 Cr 1 Mo.

The conventional Braun-type converters have greatly improved their performances thanks to the modernization according to U.S. Pat. No. 4,935,210.

However, only recently deep cracks were found in the shell walls of many converters which have been in service already many years. The necessary crack repair works are considered very serious, and require the closure or shutdown of the plant for an undetermined, lengthy period of time. In addition, even when these expensive repairs are successful, there is still the risk that the cracks may reappear (the same cracks that were repaired, and/or new ones), since the primary and original cause of the cracks had not been eliminated.

SUMMARY OF THE INVENTION

The first aim of this invention is to provide a method for modernization of axial Braun-type reactors, in particular for their transformation into axial-radial reactors, in which the danger of cracks in the shell walls and feed openings is also prevented.

The Braun-type converter comprises a pressure resisting outer shell, a feed duct for introducing synthesis gas into the shell, a gas transfer pipe for withdrawing a gaseous reaction mixture axially positioned in the feed duct, a cartridge inside the shell for holding a catalyst bed, the catalyst bed being open at the top and traversed downwardly by the synthesis gas.

Another aim of this invention is a reactor of the Braun-type transformed into an axial-radial converter type with a reduced volume of catalyst, the catalyst being of fine granulometry, and the converter being flushed with a protective gas in order to prevent cracks.

Another aim of this invention is a converter for heterogeneous synthesis, in particular heterogeneous synthesis of ammonia, of the Braun-type with fine catalyst which is axially-radially crossed, and with shell walls protected against high temperatures and without any cracks.

These aims and other aims of the invention are obtained with a process that is characterized substantially by the fact that the internal shell walls, exposed to severe thermal conditions (400° C.) typical of axial Braun-type converters, are protected by contacting them with feed gas at temperatures from 250° C. to 300° C.

More specifically, this invention provides a method of retrofitting a Braun-type converter for heterogeneous synthesis. This method comprises:

providing said cartridge with a top cover and with a substantially cylindrical bottom portion, said bottom portion B extending downwardly into said feed duct between an internal cylindrical wall thereof and said axially positioned gas transfer pipe;

inserting a first substantially perforated cylindrical wall having a first diameter inside said cartridge, said first perforated wall having a diameter slightly smaller than that of the cartridge;

connecting a bottom portion of the first cylindrical wall with the said gas transfer pipe by means of a cone-shaped wall;

inserting a second substantially perforated cylindrical wall, having a second diameter smaller than the first diameter, said second perforated wall having substantially the same diameter as said gas transfer pipe and;

providing an inlet through the shell, preferably in the form of a pipe extending through the top of the shell, and having a toroidal shaped outlet TO inside the shell, for feeding a cooling fluid between the cartridge and the shell and said internal cylindrical wall of the feed duct.

A mixer for mixing synthesis gas and cooling fluid, such as a gas passageway defined between said substantially cylindrical bottom portion of the cartridge and said gas transfer pipe may be provided.

A layer of insulating material is applied to an inner surface of the cartridge.

DETAILED DESCRIPTION OF THE INVENTION

Figure 1A:
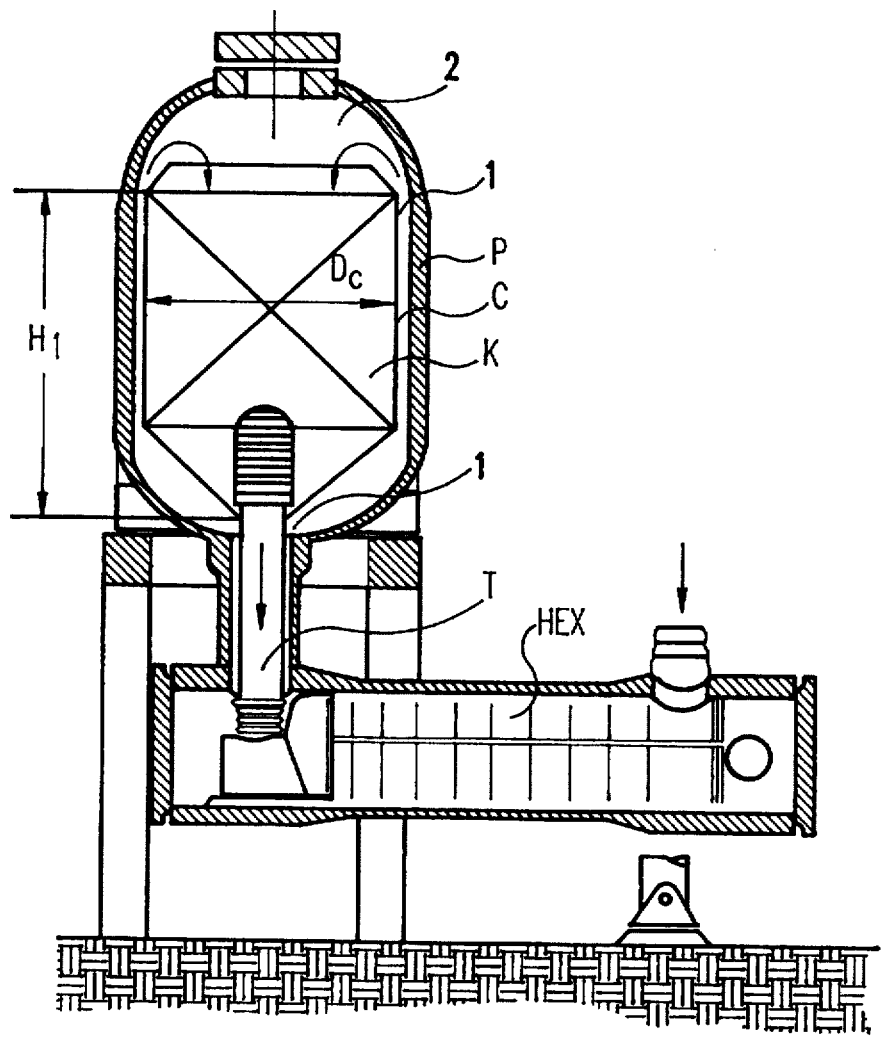
FIG. 1a schematically illustrates a prior art Braun-type reactor.

As shown in FIG. 1a, the Braun-type reactor comprises a pressure-resisting outer shell P, a feed duct 1 for introducing synthesis gas into said shell, a gas transfer pipe T for withdrawing a gaseous reaction mixture axially positioned in the feed duct, a cartridge C inside the shell for holding a catalyst bed. The catalyst bed is open at the top and traversed downwardly by the synthesis gas.

As further shown in FIG. 1a, the Braun-type reactor provides a structure whereby the reaction gas enters from the bottom of the reactor in 1 and rises in the space I between shell pad cartridge C, enters cartridge C via space 2 at the top of the reactor, and flows axially downward through catalyst bed K contained in the cartridge. The reacted gas reaches outlet tube T which feeds the heat exchange HEX outside shell P.

Figure 1B:
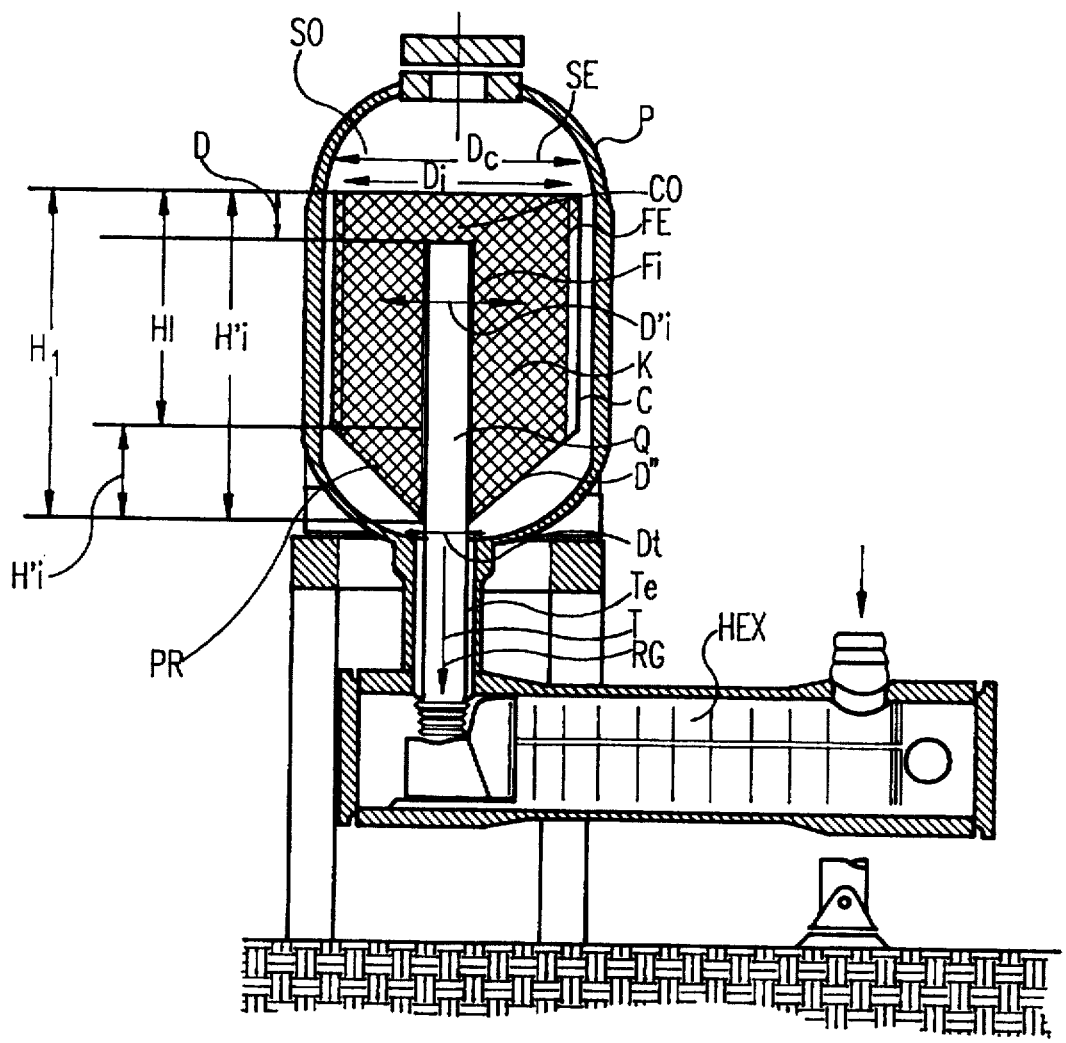
FIG. 1b schematically illustrates a Braun-type reactor as modified according to U.S. Pat. No. 4,935,210.
Figure 2:
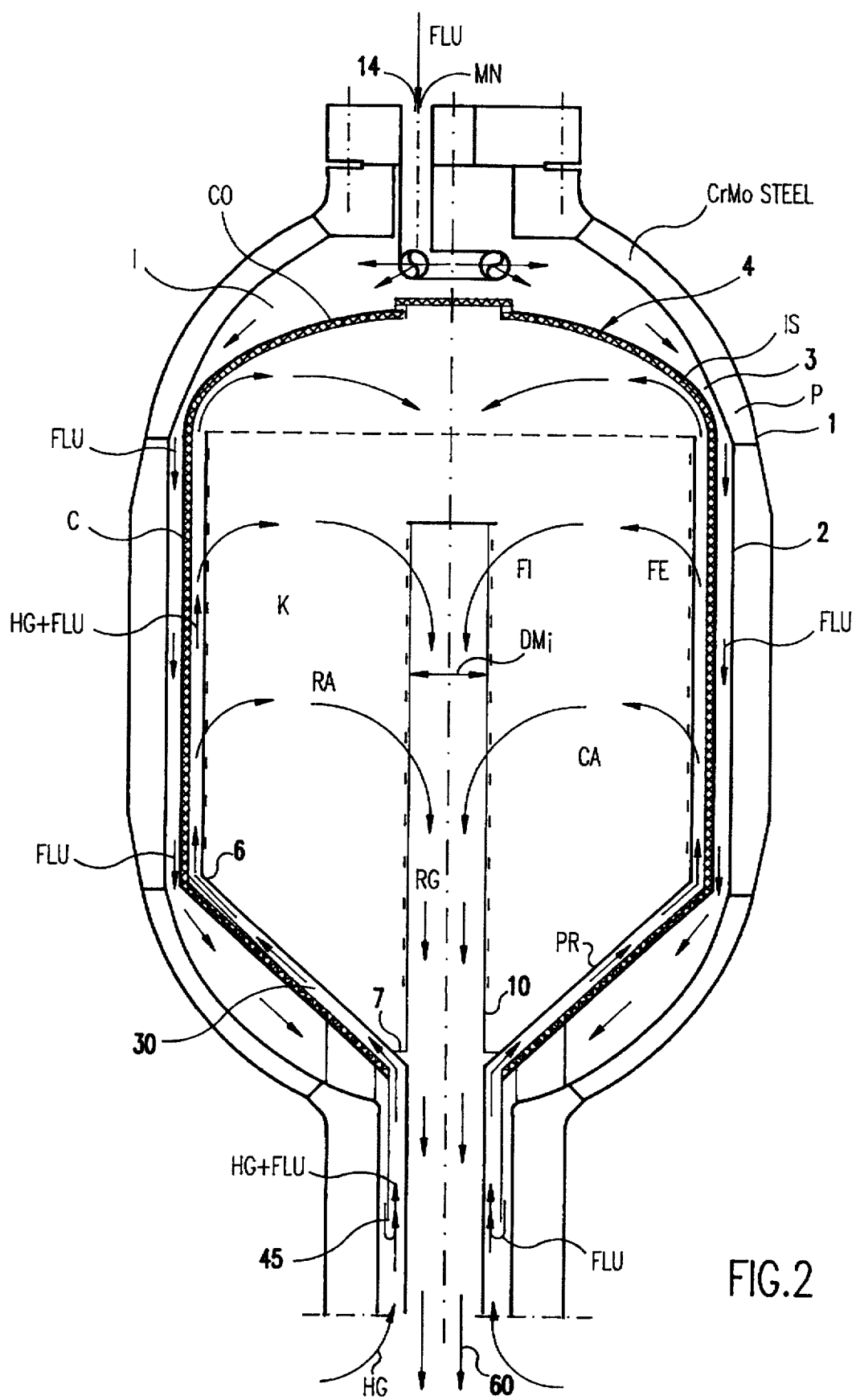
FIG. 2 schematically illustrates a modified Braun-type reactor of this invention.

FIG. 1b illustrates the Braun-type reactor shown in FIG. 2 of U.S. Pat. No. 4,935,210. P indicates the shell in which the cartridge (C) (of diameter Dc) is introduced, and the cylindrical perforated walls (FE) of diameter (Di) and height (Hi), and the walls (FI) of diameter (D'i) and height (H'i). On the top the closed manhole is shown (but without a reference). The synthesis gas enters from the bottom and flows through the airspace between the shell (P) and the cartridge (C).

In particular, the method of U.S. Pat. No. 4,935,210, for the modernization of the Braun converters and for their transformation into axial-radial reactors by means of inserting a cartridge and, inside it, two cylindrical differentially perforated walls, includes at least the following steps:

rendering the upper end of the cartridge impermeable to external gases;

applying a high thermal insulation to the internal cartridge walls;

making fresh gas flow at temperatures between 250° and 300° C., but preferably at 270° C., flow in the interspace between the internal walls of the shell and external walls of the cartridge; and use of a new gas inlet feed opening through the manhole at the upper end of the shell.

The converters, as per U.S. Pat. No. 4,935,210, are also characterized by a closed cartridge with an upper cover and a layer of insulating material, by an inlet of cooling gas preferably made in the manhole and by a mixing zone of reaction gas, which is preheated to reaction temperature, and cooling gas.

The various aspects and advantages of the present invention are better shown in the description in the form of the embodiment, as illustrated in FIG. 2, which is a schematic and partial section of the Braun reactor with a plane containing the longitudinal axis of the reactor. As in U.S. Pat. No. 4,935,210, (P) indicates the reactor shell having an external wall (1) and an internal wall (2) within which a cartridge (C) is placed, in such a way as to create an airspace (1) between the internal wall (2) of (P) and the external wall (3) of (C).

Inside (C) the cylindrical perforated wall (FE) is inserted slightly below that of the cartridge (C), and the wall (FI) of diameter (D"i), decisively lower than that of (FE). The wall is not perforated on the lower conical trunk portion (PR) that extends from point (6) to a top portion of outlet tube (7), while the internal tubular wall (FI) is not perforated on a lower portion (10), on which the final part of the zone of the conical trunk portion (PR) is coupled.

Characteristically, the upper end of the cartridge (C) is now closed with a cover (4), while its internal wall is equipped with a layer of highly insulating material (IS), for instance, kaowool, the thickness of which is in the order of a few centimeters.

According to another aspect of the invention, the upper end of the reactor (in the manhole) (MN), an inlet (14) is made for the cooling fluid (FLU), that passes first in a distribution torus (TO) on the upper end of the cartridge (C); the fluid then circulates in the airspace (I) between the shell (P) and the cartridge (C), descending down to the lower end (45) of the cartridge, where it is mixed with the flux of synthesis gas (HG) preheated to reaction temperature (340°–440° C.), preferably approximately 400° C.) in external exchangers (not represented), but of the HEX type in FIG. 1a.

The mixture of HG+FLU ascends towards the top of the airspace (30) between the wall substantially perforated (FE) and the cartridge (C); a minority portion of this mixture passes axially through the upper zone (As) of the catalytic mass (K), while the majority portion of the mixture HG+FLU passes radially through zone (RA), which are also a majority zone, of said catalytic mass (K). The reacted gases (RG) are collected tubular wall substantially perforated (FI) and exit at the bottom (arrow 60) in order to be carried to the external heat exchangers (type HEX, as shown in FIG. 1a).

It is true that with respect to conventional Braun converters, a certain volume of catalyst is lost, i.e., that which is now occupied by the airspaces (I) and (30) as well as by the delimited space from the pipe (FI); but it is also true that this loss of catalyst volume is largely compensated by the fact that now the catalytic mass (CA) is made of fine granulometric catalyst with a high contact surface, contrary to the catalyst of large granulometric type which was required to be used in conventional converters.

Although the present invention has been described in relation to particular embodiments thereof, many other variations and modifications and other uses will become apparent to those skilled in the art. The present invention is to be limited not by the specific disclosure herein, but only by the appended claims.

What is claimed is:

1. A method of retrofitting a Braun-type converter for heterogeneous synthesis, said Braun-type converter comprising a pressure-resisting outer shell, a feed duct for introducing synthesis gas into said shell, a gas transfer pipe for withdrawing a gaseous reaction mixture axially positioned in the feed duct, a cartridge inside the shell for holding a catalyst bed, the catalyst bed being open on top and traversed downwardly by the synthesis gas, said method comprising the steps of:

inserting a first substantially perforated cylindrical wall having a first diameter inside said cartridge, said first perforated wall having a diameter slightly smaller than that of the cartridge;

connecting a bottom portion of the first cylindrical wall with said gas transfer pipe by means of a cone-shaped wall;

inserting a second substantially perforated cylindrical wall, having a second diameter smaller than the first diameter, said second perforated wall having substantially the same diameter of said gas transfer pipe;

providing said cartridge with:
  i) a top cover;
  ii) a substantially cylindrical bottom portion, said bottom portion extending downwardly into said feed duct between an internal cylindrical wall thereof and said axially proportioned gas transfer pipe;
  iii) a lower portion, substantially parallel to said cone-shaped wall, having a diameter decreasing starting from the diameter of the cartridge towards the diameter of said substantially cylindrical bottom portion; and providing an inlet through the shell for feeding a cooling fluid between the cartridge and the shell down to said substantially cylindrical bottom portion.

2. A method according to claim 1, further comprising the step of introducing into the converter a mixer for mixing synthesis gas and cooling fluid.

3. A method according to claim 2, wherein the mixer comprises a gas passageway defined between said substantially cylindrical bottom portion of the cartridge and said gas transfer pipe.

4. A method according to claim 1, wherein the cooling fluid inlet is provided on top of the shell.

5. A method according to claim 1, wherein the cooling fluid inlet comprises a pipe extending through the shell, the pipe having a toroidal-shaped outlet located on an end of the pipe positioned inside the shell.

6. A method according to claim 1, further comprising the step of applying a layer of insulating material to an inner surface of said cartridge.

7. A retrofitted Braun-type converter for heterogeneous synthesis, the converter having been retrofitted into an axial-radial converter, the converter comprising:

a shell;

a gas transfer pipe for withdrawing a gaseous reaction mixture axially positioned in the feed duct;

a feed duct for introducing synthesis gas into said converter;

a cartridge located inside the shell for holding a catalyst bed, said catalyst bed including: means for causing axial-radial fluid flow through the catalyst bed, a first cylindrical wall having a first diameter, a cone-shaped wall connected to the first cylindrical wall, a second cylindrical wall, having a second diameter smaller than the first diameter, said second perforated wall having substantially the same diameter of said gas transfer pipe;

said cartridge comprising:
  i) a top cover;
  ii) a substantially cylindrical bottom portion, said bottom portion extending downwardly into said feed duct between an internal cylindrical wall thereof and said axially positioned gas transfer pipe;
  iii) a lower portion, substantially parallel to said cone-shaped wall, having a diameter decreasing starting from the diameter of the cartridge towards the diameter of said substantially cylindrical bottom portion;

an inlet through the shell for feeding a cooling fluid between the cartridge and the shell down to said substantially cylindrical bottom portion, and whereby the cartridge causes the cooling fluid to flow downward from a top portion of the converter to a bottom portion thereof, thereby cooling said shell and feed duct.

8. A converter according to claim 7, further comprising a mixer for mixing synthesis gas and cooling fluid.

9. A converter according to claim 8, wherein the mixer comprises a gas passageway defined between said substantially cylindrical bottom portion of the cartridge and said gas transfer pipe.

10. A converter according to claim 7, wherein the cooling fluid inlet is located on top of said shell.

11. A converter according to claim 7, wherein the cooling fluid inlet comprises a pipe extending through the shell, the pipe having a toroidal-shaped outlet located on an end of the pipe positioned inside the shell.

12. A converter according to claim 7, wherein the means for causing axial-radial fluid flow through the catalyst bed comprises said first and second cylindrical walls.

13. A converter according to claim 7, further comprising a layer of insulating material applied to an inner surface of said cartridge.

* * * * *